United States Patent
Micaelian et al.

(10) Patent No.: US 6,714,929 B1
(45) Date of Patent: Mar. 30, 2004

(54) WEIGHTED PREFERENCE DATA SEARCH SYSTEM AND METHOD

(75) Inventors: Fadi Victor Micaelian, Menlo Park, CA (US); Richard Sawey, San Carlos, CA (US); Emil Mario Scoffone, Menlo Park, CA (US); David Brandon Criswell, San Carlos, CA (US)

(73) Assignee: Auguri Corporation, San Carlos, CA (US)

( * ) Notice: Subject to any disclaimer, the term of this patent is extended or adjusted under 35 U.S.C. 154(b) by 312 days.

(21) Appl. No.: 09/834,441

(22) Filed: Apr. 13, 2001

(51) Int. Cl.⁷ ............................................. G06F 17/30
(52) U.S. Cl. ......................................................... 707/4
(58) Field of Search ............................................. 707/4

(56) References Cited

U.S. PATENT DOCUMENTS

| | | | | |
|---|---|---|---|---|
| 5,684,704 A | * | 11/1997 | Okazaki | 701/208 |
| 5,734,890 A | * | 3/1998 | Case et al. | 707/5 |
| 5,826,260 A | * | 10/1998 | Byrd et al. | 707/5 |
| 5,933,818 A | * | 8/1999 | Kasravi et al. | 706/12 |
| 5,963,939 A | * | 10/1999 | McCann et al. | 707/4 |
| 5,963,951 A | * | 10/1999 | Collins | 707/102 |
| 5,970,482 A | * | 10/1999 | Pham et al. | 706/16 |
| 5,983,237 A | * | 11/1999 | Jain et al. | 707/104.1 |
| 6,052,122 A | * | 4/2000 | Sutcliffe et al. | 345/751 |
| 6,178,406 B1 | | 1/2001 | Cheetham et al. | |
| 6,266,668 B1 | * | 7/2001 | Vanderveldt et al. | 707/10 |
| 6,269,303 B1 | * | 7/2001 | Watanabe et al. | 701/209 |
| 6,272,467 B1 | * | 8/2001 | Durand et al. | 705/1 |
| 6,327,574 B1 | * | 12/2001 | Kramer et al. | 705/14 |
| 6,353,822 B1 | * | 3/2002 | Lieberman | 707/3 |
| 6,438,579 B1 | | 8/2002 | Hosken | |
| 6,457,052 B1 | | 9/2002 | Markowitz et al. | |
| 6,546,388 B1 | * | 4/2003 | Edlund et al. | 707/5 |

(List continued on next page.)

OTHER PUBLICATIONS

Exhibits A and B are exemplary screen shots of an example for an example Decision Support System ("DSS") that was sold in 1995 to the software distributor MacZone in the United States.

User manual for the product "Auguri Triple C," that was sold in 1995 to the software distributor MacZone in the United States. Both the manual and the related product were authored by Fadi Micaelian.

Kiebling, Werner, "Foundations of Preferences in Database Systems", 2002 VLDB conference http://222.cs.ust.hk/vldb2002/program–info/research.html (PDF Presentation Slides—2.9 MB) University of Augsburg, Germany.

Kossmann, Donald et al., "Shooting Stars in the Sky: An Online Algorithm for Skyline Queries", 2002 VLDB conference http://222.cs.ust.hk/vldb2002/program–info/research.html (PDF Presentation Slides—83 MB) Technische Universitat Munchen, Germany.

Primary Examiner—Wayne Amsbury
(74) Attorney, Agent, or Firm—Perkins Coie LLP

(57) ABSTRACT

A search engine for databases, data streams, and other data sources allows user preferences as to the relative importance of search criteria to be used to rank the output of the search engine. A weighted preference generator generates weighted preference information including at least a plurality of weights corresponding to a plurality of search criteria. A weighted preference data search engines uses the weighted preference information to search a data source and to provide an ordered result list based upon the weighted preference information. A method for weighted preference data searching includes determining weighted preference information including a plurality of search criteria and a corresponding plurality of weights signifying the relative importance of the search criteria, and querying a data source and ranking the results based upon the weighted preference information. In addition to allowing client input of the relative importance of various search criteria, the system and method also preferably include the ability to provide a subjective ordering for at least some of the search criteria.

7 Claims, 12 Drawing Sheets

U.S. PATENT DOCUMENTS

| | | | |
|---|---|---|---|
| 6,549,897 B1 * | 4/2003 | Katariya et al. | 707/5 |
| 2001/0029183 A1 | 10/2001 | Ito | |
| 2001/0054054 A1 * | 12/2001 | Olson | 709/1 |
| 2002/0004757 A1 * | 1/2002 | Torres et al. | 705/26 |
| 2002/0024532 A1 * | 2/2002 | Fables et al. | 345/700 |
| 2002/0032638 A1 * | 3/2002 | Arora et al. | 705/37 |
| 2002/0042786 A1 * | 4/2002 | Scarborough et al. | 706/21 |
| 2002/0055900 A1 | 5/2002 | Kansal | |
| 2002/0059228 A1 * | 5/2002 | McCall et al. | 707/6 |
| 2002/0103792 A1 | 8/2002 | Blank et al. | |
| 2002/0129014 A1 | 9/2002 | Kim et al. | |
| 2002/0138399 A1 | 9/2002 | Hayes et al. | |
| 2002/0138456 A1 * | 9/2002 | Levy et al. | 706/25 |
| 2002/0138481 A1 | 9/2002 | Aggarwal et al. | |
| 2002/0173978 A1 | 11/2002 | Boies et al. | |
| 2002/0191954 A1 | 12/2002 | Beach et al. | |
| 2003/0014326 A1 * | 1/2003 | Ben-Meir et al. | 705/26 |
| 2003/0014428 A1 | 1/2003 | Mascarenhas | |
| 2003/0061201 A1 | 3/2003 | Grefenstette et al. | |
| 2003/0061202 A1 | 3/2003 | Coleman | |
| 2003/0061214 A1 | 3/2003 | Alpha | |
| 2003/0061242 A1 | 3/2003 | Warmer et al. | |

* cited by examiner

PROPERTY TABLE: CARS

← PROPERTIES →

| MAKE | COLOR | PRICE | HP | GAS MILEAGE | CUP HOLDER |
|---|---|---|---|---|---|
| FERRARI | RED | $100,000 | 500 | 30 | NO |
| MUSTANG | BLACK | $25,000 | 300 | 35 | YES |
| YUGO | GREEN | $8,000 | 50 | 18 | YES |

(ALTERNATIVES: FERRARI, MUSTANG, YUGO)

FIG. 4

WEIGHTS TABLE

| MAKE | COLOR | PRICE | HP | GAS MILEAGE | CUP HOLDER |
|---|---|---|---|---|---|
| 0 | 10 | 5 | 0 | 1 | 0 |

FIG. 5

SUBJECTIVE ORDERING TABLE

| MAKE | COLOR | PRICE | HP | GAS MILEAGE | CUP HOLDER |
|---|---|---|---|---|---|
| FERRARI | 6 | $100,000 | 500 | 30 | 0 |
| MUSTANG | 1 | $25,000 | 300 | 35 | 1 |
| YUGO | 3 | $8,000 | 50 | 18 | 1 |

FIG. 6B

| COLOR | VALUE |
|---|---|
| RED | 6 |
| BLACK | 1 |
| GREEN | 3 |

Current Vehicle: Audi

Criteria

| Criteria Definition For Vehicle | Audi ▼ | | | | | |
|---|---|---|---|---|---|---|
| Name | Description | Datatype | Minimum value | Maximum value | Ideal value | |
| 78—Exterior Color | | List of value | N/A | N/A | | Edit Delete |
| 80—Interior Color | | List of value | N/A | N/A | | Edit Delete |
| 82—Transmission | | List of value | N/A | N/A | Automatic | Edit Delete |
| 84—Drive Train | | List of value | N/A | N/A | Automatic | Edit Delete |
| 86—Condition | | List of value | Fair | Excellent | Excellent | Edit Delete |
| 88—Roof | | List of value | N/A | N/A | Excellent | Edit Delete |

New Vehicle  New Criteria  Inventory Ranking Screen

Auguri2000 Decision Engine

Use this screen to tell us what you care about in your new car and we'll then tell you what cars we think you should consider.

On the left indicate how much you care about a feature by adjusting the side controls. Remember you're saying you care a lot about price, not that you're willing to pay a lot of money! When you're ready hit the Analyse and our SmartSearch engine will return a list of appropriate vehicles for your consideration.

Specify Importance

| | Not Important | | Very Important |
|---|---|---|---|
| Space | | ◆ | |
| Performance | | ◆ | |
| Safety | | ◆ | |
| Gas Mileage | | ◆ | |
| Maintenance Costs | | ◆ | |
| Comfort | | ◆ | |
| Price | | | ◆ |

Analyse →

Vehicle Ranking

| Rank | Vehicle | Score | Talk To Us Now |
|---|---|---|---|
| 1 | Ford Focus ZX3 Coupe | 66% | Talk Now |
| 2 ▶ | Ford Escape TWD Sport Utility 4D | 60% | Talk Now |
| 3 ▶ | Ford Taurus SE-V6 Wagon 4D | 54% | Talk Now |
| 4 ▶ | Ford Mustang V6 (3.8 Liter) Deluxe Coupe 2D | 50% | Talk Now |
| 5 ▶ | Ford Escort ZX2 Coupe | 49% | Talk Now |

WEIGHTED PREFERENCE DATA SEARCH SYSTEM AND METHOD

BACKGROUND OF THE INVENTION

This invention relates generally to data searching methods and systems including, for example, relational database searching methods and systems.

An increasingly vast amount of data is being stored in digital electronic formats. The value of this data is often dependent upon how effectively it can be retrieved to provide useful information. For this reason, a variety of database structures and database search engines have been developed over the years.

A large body of data has been stored in proprietary databases, which are accessed via custom-crafted software ("code"). In such proprietary databases, there is a tight coupling between data organization (i.e. in the actual data structure) and in the access and query code. While the advantages of such proprietary databases include speed of access, compactness, and simplicity, they are typically not well suited for general-purpose data storage and retrieval applications. This is because with proprietary databases modifications to the data structures requires the rewriting of the access and query code, and because the queries tend to be fixed by being implemented in a programming language and then being compiled into the query code.

With the ever increasing amount of electronic data available and with the increasingly sophisticated demands for specialized information derived from such data, search engine techniques have become increasingly sophisticated and generalized. At the present time, the two main approaches for information retrieval include relational database searching engines, and text-based searching technologies as used, for example, for Internet searching.

Relational databases have been increasingly utilized over the past two decades in order to overcome the limitations of previous database architectures. One of the great strengths of relational databases is that they offer a flexible way to access the data along different dimensions and based on a set of criteria. The industry standard language, Structured Query Language (SQL), is used to define and execute such queries. SQL was initially designed by IBM Corporation and was later popularized by including it in relational database engines from such companies as IBM and Oracle Corporation, amongst others.

By using a relational database search engine such as SQL or the like, information can be obtained from the relational database based upon a multiplicity of factors. For example, an SQL inquiry can search a personnel database of a company for all employees that are making more than $20,000.00 a year and who have been employed with the company for less than twenty years.

Relational database search engines, such as the aforementioned SQL search language, suffer from the disadvantage of creating "yes or no" or "black and white" results. Using the previous example, a user searching for company employees making a salary of greater than $20,000.00 and less than twenty years with the company would miss all of the employees that were making exactly $20,000.00 or a few dollars less than $20,000.00 and those that worked exactly twenty years at the company or just over twenty years for the company, e.g. twenty years and one day. As such, there is no "fuzziness" in such a relational database search request, and no indication of the importance of exactly fitting within the search criteria.

Sophisticated search engines using text-searching technologies approach the problem from a different direction. These text-searching technologies are used by Internet-based search engines such as Yahoo!, Alta Vista, etc. With the text based searching technologies, the search engine creates indexes based upon the words found in searched documents. When a user specifies one or more phrases to the search engine, the search engine checks these indexes and then uses some algorithm to produce a ranking of all the documents that contain the search words or phrases. The algorithm varies depending upon the search engine, but may be as simple as a count of matched words.

Text based search engines suffer from several common limitations. For one, they cannot perform trade-off analysis between various criteria, such as searching for information concerning cars which cost less than $30,000 and which have engines with more than 500 horsepower. For another, they are limited to text-based documents as their search domain. Finally, they do not provide any effective means for a user to specify how important a particular word is to that use.

The prior art therefore suffers from the inability for users or automated clients of a database search engine to specify preferences or "weights" with respect to various search criteria, thereby introducing a degree of "fuzziness" into the search request which provides a better retrieval of information from the database or other data source.

SUMMARY OF THE INVENTION

The present invention allows users and automated clients of a database search engine to specify the importance of various search criteria when making data searches. This permits a ranking of search results to present data in a more relevant fashion to the user or other client (e.g. an automated process).

A weighted preference information search system in accordance with the present invention includes a weighted preference generator and a weighted preference data search engine. The weighted preference generator develops weighted preference information including weights corresponding to search criteria. The weighted preference data search engine uses the weight of the preference data to search an information source and to provide an ordered result list based upon the weighted preference information.

The weighted preference data search system is often used to search a relational database. However, the search system can also be used to search a number of other data sources including flat databases, text-based databases, and data streams. In the case of data streams, the search system can search in real time or it can search the data stream after it has been buffered or stored in a computer readable media.

The weighted preference generator is preferably a client to the weighted preference data search engine. Alternatively, the weighted preference generator and weighted preference data search engine can be integrated processes. As a client, the weighted preference generator can include a user interface which allows a human user to input preferences into the generator. These preferences can include one or more of the selection of search criteria, the adjustment of weights with respect to the search criteria, and an indication of subjective ordering of at least one of the search criteria. Alternatively or additionally, the weighted preference generator can provide weighted preference information based upon at least one of default values, automated heuristics, user input, or other sources of input such as from devices such as machine sensors, temperature gauges, etc.

Preferably, the weighted preference data search system includes a data store and an algorithm processor. The data store stores data for the use of the algorithm processor such as client preferences, historical search data, and intermediate search results. The algorithm processor includes a data source reader, a normalizing alternative distance calculator, and an alternative scorer which creates a ranking for the alternatives based upon the normalized alternative distances and weighted preference information.

A method for weighted preference data searching in accordance with the present invention includes determining weighted preference information including a plurality of search criteria and a corresponding plurality of weights signifying the relative importance of the search criteria, and querying an information source and ranking the results based upon the weighted preference information. The data sources are often a database, e.g. a relational database. Alternatively, the data source can be a data stream which is arriving either in real-time or which has been buffered in a computer readable media.

In an embodiment of the present invention, in addition to providing a plurality of weights, a subjective ordering may be provided for at least one search criteria. As an example, the color of a car might be very important to a user and therefore given a relatively high numerical weight. However, there is a subjective aspect to color. For example, for one user the color red for a car might be very important, while for another user having a black car is very important. Subjective ordering permits criteria such as "color" to be associated with a subjective ordering of which colors are desired by the user and in what order.

Preferably, the method for determining weighted preference data includes determining whether or not there should be user input. If there is not user input, the system or "client" provides at least one of default and automatically heuristically determined weights to the search engine. If user input is allowed, it is determined whether the user should be allowed to select criteria. If not, at least one of default and automatically heuristically determined criteria selections is made for the user. If the user is allowed to select criteria, user selection is input into the system. Additionally, it is determined whether the user should be able to adjust weights. If not, at least one of default and automatically heuristically determined weights is provided by the system. If the user is allowed to select weights, the weights are input into the system by the user. It is also preferably determined whether the user should be able to input subjective ordering into the system. If the user cannot specify subjective ordering, the system provides the orderings that are needed by the engine. If the user is able to input subjective ordering, the subjective ordering is input by the user into the system.

A method for weighted preference data searching includes reading information from a data source including a set of alternatives, each alternative containing values for a number of criteria. Next, the distance to an ideal value is measured and then normalized and stored. Then, for each criterion, the normalized distance data is multiplied by its corresponding weight and accumulated to obtain a score for the alternative. The alternatives are then ranked by their scores.

An alternative method for weighted preference source searching includes reading information from a data source including data for a plurality of alternatives. Next, for each criteria of each alternative the distance to an ideal value is measured and normalized distance data is created and then multiplied by its corresponding weight and accumulated to obtain a score for the alternative. The alternatives are then ranked based upon their scores.

An advantage of the present invention is that complex database queries can be made that have a degree of "fuzziness" which are based upon user or other client input as to the importance or "weight" of particular search criteria. By providing this functionality, the search engine can provide results that are ranked by factoring a number of weighted search criteria to obtain results that best match the client's specifications.

Another advantage of the present invention is its ability to enhance searches through an imbedded trade-off analysis capability, such that the client does not need to perform tradeoff analysis by a time consuming iterative approach through a repetitive set of queries.

These and other advantages of the present invention will become apparent to those skilled in the art upon a reading of the following detailed descriptions and a study of the various figures of the drawings.

BRIEF DESCRIPTION OF THE DRAWINGS

FIG. 4 is a property table used to identify the "IDENTIFY DATA TO SEARCH" operations of FIG. 3;

FIG. 5 is a weights table used to illustrate the "SELECT CRITERIA" and "ADJUST WEIGHTS" operations of FIG. 3;

FIG. 6A is a subjective ordering conversion table;

FIG. 6B is a subjective ordering table illustrating the "MAKE SUBJECTIVE ORDERING" operations of FIG. 3;

FIG. 7 is a screen shot of a web page allowing the selection of criteria;

FIG. 8A is a screen shot of a web page allowing for the adjustment of weights;

DETAILED DESCRIPTION OF THE PREFERRED EMBODIMENTS

Figure 1:
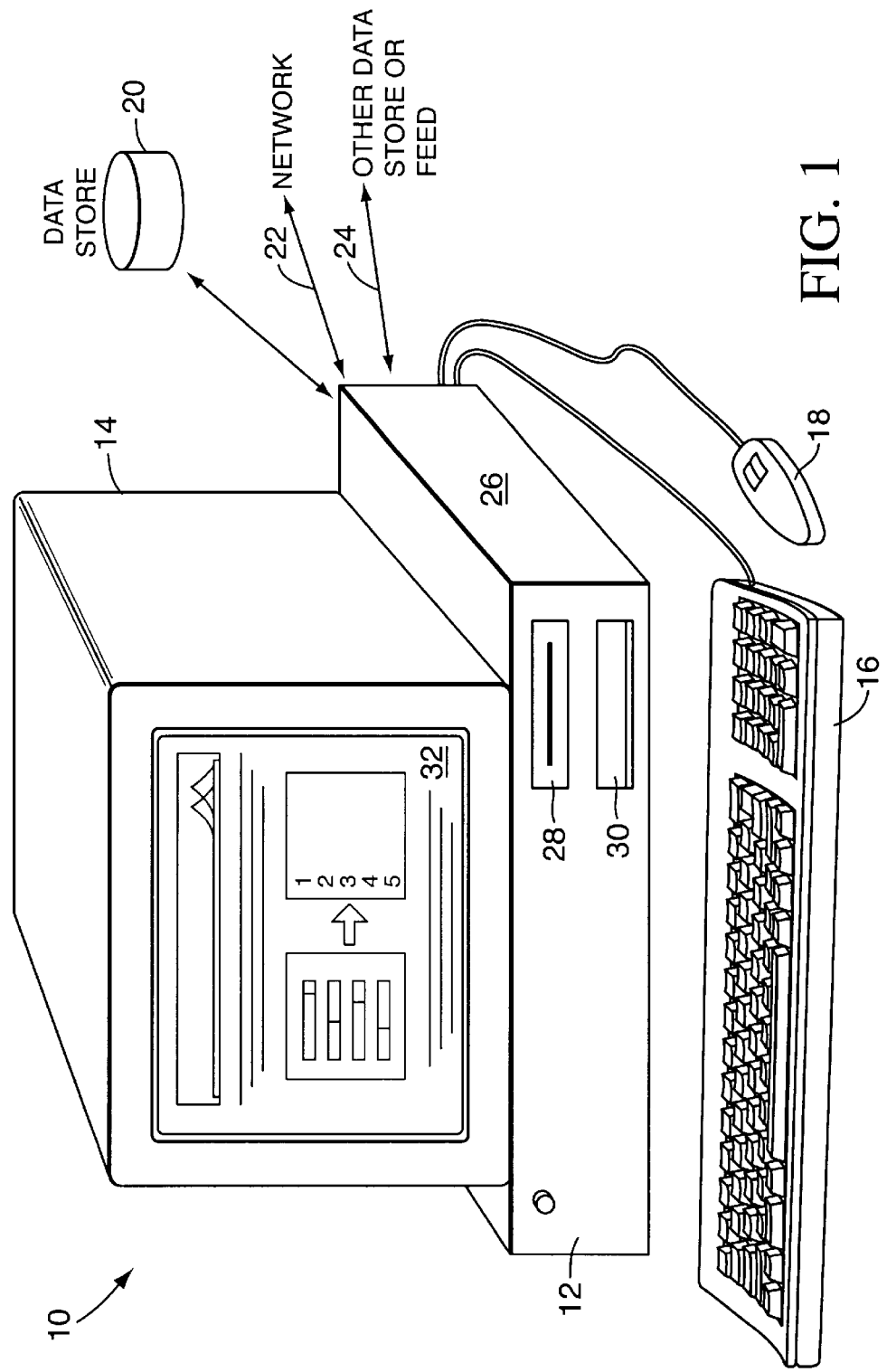
FIG. 1 is an exemplary computer system implementing the weighted preference data search system and method of the present invention.

FIG. 1 is a computer system 10 which is used to implement a weighted preference data source search system and a method for weighted preference data source searching in accordance with the present invention. The computer system 10 includes a computer unit 12, a computer monitor 14, a keyboard 16, and a pointing device such as a mouse 18. The computer system 10 also typically includes a number of peripheral devices and connections including external data stores 20 (such as hard disk and optical drives), network connections 22, and other data stores or data feeds 24.

The computer system 10 serves as an illustration of one of a variety of data processing units including personal computers, work stations, network computers, etc. If implemented as a personal computer, it typically includes an enclosure 26 enclosing a motherboard having a microprocessor CPU, computer readable media such as the RAM, ROM, hard disk drives, etc., and a number of peripherals. Peripherals can include, for example, floppy disk drive 28, DVD/CD-ROM drives 30 etc., which accept removable computer readable media which typically stores data in magnetic, optical or magneto-optical fashions. The computer monitor 14 includes a screen 32 which can provide user feedback and thus, along with keyboard 16 and mouse 18 form part of the user/computer interface. The components of computer system 10 are commercially available and are well known to those skilled in the art.

Figure 2:
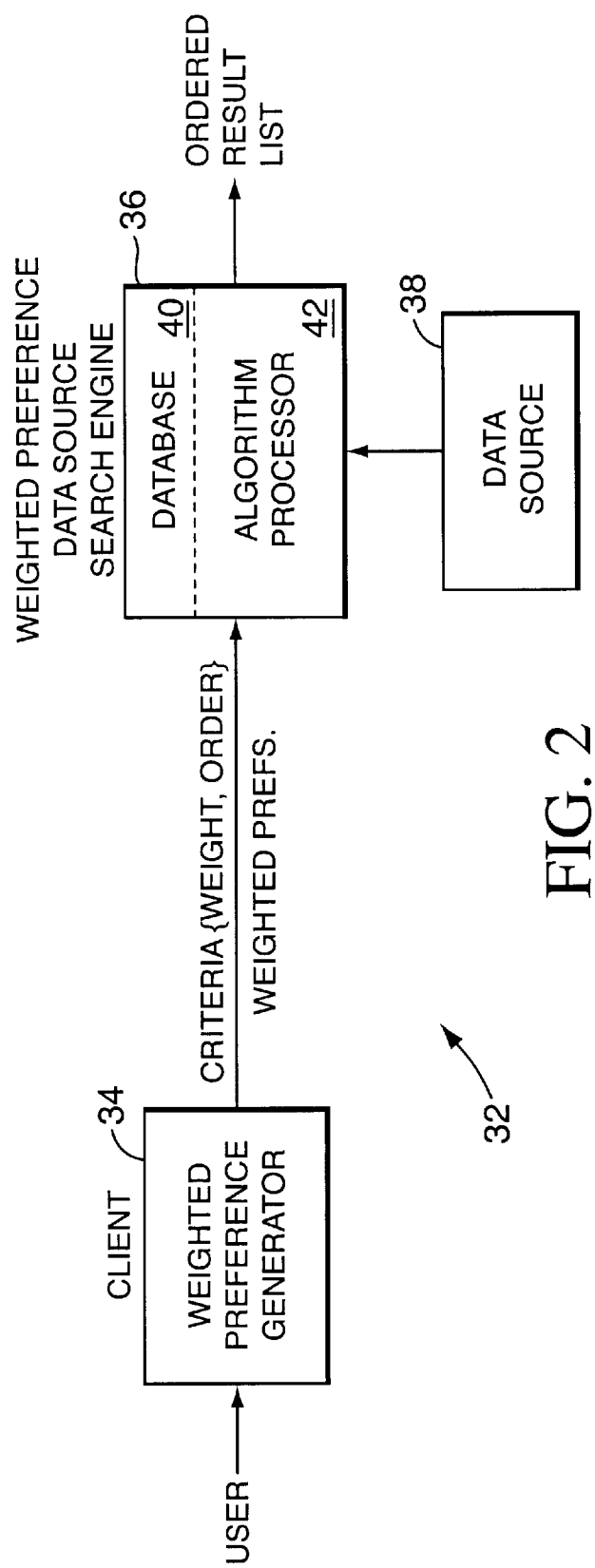
FIG. 2 illustrates a weighted preference data search system in accordance with the present invention.

FIG. 2 illustrates a weighted preference data source search system 32 which can be implemented on the computer system 10. Again, the computer system 10 is just one way to implement the search system 32 since the systems and methodology of the present invention can be distributed or combined in a variety of fashions over a local or extended network, as will be appreciated by those skilled in the art. The weighted preference data source search system 32 preferably includes a weighted preference generator 34, and a weighted preference data source search engine 36. The search engine 36 interfaces with a data store or feed 38, as will be appreciated by those skilled in the art.

The data source 38 is typically a database. Most large and/or sophisticated databases are now relational databases due to the advantages described previously. Alternatively, the data source can be an information stream or feed coming in, for example, from a wire or cable service. For example, stock market data can be retrieved as a continuous information stream. This information stream can be processed in real time, or can be buffered in a computer readable media for time-delayed data processing.

The weighted preference generator 34 is, in the illustrated embodiment of FIG. 2, a client to the search engine 36. The weighted preference generator 34 provides weighted preferences to the search engine, which preferably include criteria and associated weights and subjective ordering. Alternatively, the weighted preference generator can in some instances be integrated with the functionality of the search engine.

It should be noted that the client weighted preference generator 34 can be an automated client, a human user client, or a combination of the two. If fully or partially automated, the client can provide weighted preference information to the search engine 36 based upon certain stored default values or based upon automated heuristics. The automated heuristics can be produced by a number of techniques well known to those skilled in the art including historical or demographic data analysis, artificial intelligence techniques, fuzzy logic techniques, rule of thumb, input device, etc.

In the illustrative embodiment of FIG. 2, the weighted preference data source search engine 36 includes a database 40 and an-algorithm processor 42. The database 40 is used by the algorithm processor and can include such data as client preferences, historical search data, an intermediate search results. It is not typically the subject of the search desired by the client 34. As will be described in greater detail subsequently, the algorithm processor 42 preferably includes a data source reader, a normalizing alternative distance calculator, and an alternative scorer which creates a ranking for the alternatives.

Figure 3:
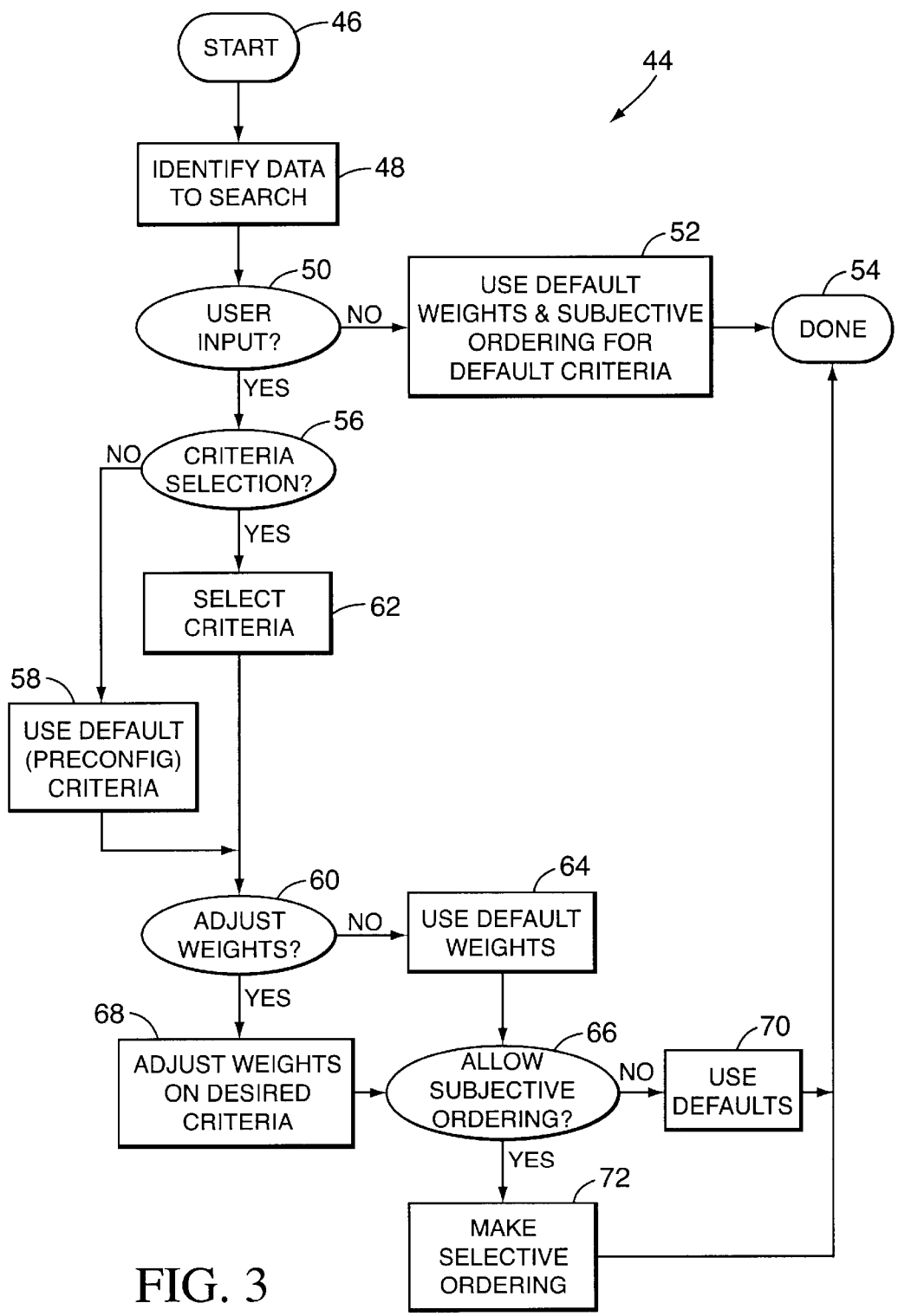
FIG. 3 is a flow diagram illustrating algorithms implemented by the weighted preference generator of FIG. 2.

FIG. 3 is a flow diagram of a method 44 which can be implemented by the weighted preference generator 34 of the FIG. 2. The method 44 begins at 46 and, in an operation 48, the information to be searched is identified. The method or algorithm 44 then determines in a decision operation 50 whether there is user input by the client 34. If not, an operation 52 uses default weights and subjective ordering for the default criteria. As explained previously, these default weights can either be stored defaults or can be determined by one of a number of automated heuristics or other techniques. The process 44 is then completed at 54.

If there is user input as determined by decision operation 50, a decision operation 56 determines whether there is to be criteria selection by the user. If not, operation 58 assigns default (e.g. pre-configured) criteria, using the definition of "default" as described above to include either stored values or automatically created values based upon some form or heuristics. The method 44 then determines in an operation 60 whether the user should be allowed to adjust the weights. If operation 56 determines that the user is to be allowed criteria selection then the criteria selected in an operation 62 before process control is turned over to operation 60.

In operation 60, it is determined whether the weights are to be adjusted by the user. If not, default weights are assigned in an operation 64 (using the same definition as above), and operational control is turned over to operation 66 to determine if the user should be allowed subjective ordering. If operation 60 determines that the user is allowed to address the weight, an operation 68 inputs the adjusted weights on desired criteria from the user. Operational control is then turned over to operation 66.

In operation 66, it is determined whether the user should do subjective ordering. If not, defaults are assigned (using the same definition as above) in an operation 70 and the process 44 is completed at 54. If operation 66 determines that subjective ordering is to be allowed, selective ordering is input from the user in an operation 72 before the process is completed at 54.

FIG. 4 is an illustration of a property table and helps to illustrate the "IDENTIFY INFORMATION TO SEARCH" operation 48 to FIG. 3. As will be appreciated by those skilled in the art, in a relational database search, the table illustrated in FIG. 4 would be accessed through an SQL query. In this instance, the table of FIG. 4 is the property table for cars. The table includes a set of alternatives, in this case car models, where each alternative is on a separate row. The columns of the table provide the properties for each alternative. In this example, the various properties include make, color, price, engine horsepower (HP), gas mileage, and the availability of a cup holder. To keep things simple, three alternatives are shown namely for the makes of Ferrari, Ford Mustang, and Yugo. These might represent, for example, the available cars on a particular car lot and list the designated properties for each of the available makes. As can be seen, the properties associated with the different makes of cars can vary considerably from car to car, making it difficult to select which type of car to present to the user or other client until the user or client provides an indication of the relative importance of the various properties.

FIG. 5 illustrates a weights table which is used to help to explain the criteria selection and weight adjustment operations of FIG. 3. In this illustrated example, a variety of "weights" indicating the relative importance to the user or other client is illustrated, where these weights range from zero to ten. In this illustrated example, a zero means that the property or "criteria" is of no importance and, effectively, this criteria or property is not selected. A ten indicates that this property or criteria is of utmost importance to the user or other client. In this example, make, engine horsepower, and cup holder were assigned a zero weight meaning, essentially, that these criteria were not selected and therefore have no effect on the ranking. On the other hand color, price, and gas mileage were assigned a weight, meaning that these criteria were selected. It is clear from the illustrated criteria table of FIG. 5 that the user or other client in this instance feels that color is the most important criteria in selecting a car, price less so, and gas mileage, while not totally irrelevant, is not a very important consideration. On the other hand the make of the car, its engine horsepower, and whether or not it has a cup holder is of no importance to the user or other client.

FIG. 6A illustrates a subjective ordering conversion table which can be used, for example, to populate the "color" column in a subjective ordering table shown as illustrated in FIG. 6B. Subjective ordering conversion tables are populated by a user's input or are automatically heuristically determined.

FIG. 6B is a subjective ordering table which will be used to help explain the subjective ordering operations of FIG. 3. While, in theory, virtually any property or criteria is subject to subjective ordering, often criteria have an implicit subjective ordering that does not require user input. For example, if price is important to a user or other client, it can be assumed that they want the lowest price available, not the highest price available. Likewise, if gas mileage is of importance to a user or other client, it can be assumed that they would like the highest possible gas mileage, not the lowest possible gas mileage. However, certain properties or criteria are purely subjective. As noted in the example of FIG. 5, color is indicated to be of great importance. However, different people like different colors. For example, some people like cherry red cars, while other people would not be caught driving a cherry red car. Therefore, as illustrated in the second column of FIG. 6B, the colors of the various makes of cars have been subjectively ordered by the user or other clients. In the instance, the color red has been assigned a relatively high numeric value of 6, the color black has been assigned a relatively low number of 1, and the color green has been assigned the intermediate numeric value of 3. As it will be appreciated, since the color of red is of high importance to the user or other client the user or other client may be steered towards the Ferrari. On the other hand, since price is also important (although as not as important as color) the user or other client might be steered towards the Ford Mustang. The balancing of these various weighted alternatives will ultimately result in a ranking of desirability of the various alternatives, as will be explained in greater detail with respect to the following descriptions.

FIG. 7 is a "screen shot" 74 of a web page that can be displayed, for example, on the screen 32 of computer system 10. As will be appreciated by those skilled in the art, a web browser such as Internet Explorer® or a Netscape Navigator® or America Online (AOL®) is used to interface with a web site connected to a TCP/IP network. The TCP/IP network is often the publicly available Internet, but can also on a private Intranet, Extranet, etc. Further, it should be noted that the functionality of the systems can be provided on a local computer or on a local computer network in addition to over a TCP/IP network, as will be appreciated by those skilled in the art.

FIG. 7 illustrates a user interface for selecting criteria in accordance with the present invention. In this instance, the criteria definition is selected from a pull-down menu 76 to include a number of properties 78–88. These properties are, respectively, an exterior color property 78, an interior color property 80, a transmission property 82, a drive property 84, a condition property 86, and a roof property 88. The transmission property can, for example, specify a manual or automatic transmission, the number of gears, etc. The roof property 88 can be, for example, convertible, hard top, or sedan. Specification of such details as the roof property and its associated values are preferably determined by additional input screens (not shown), as will be appreciated by those skilled in the art.

The user interface for selecting criteria allows the definition of criteria along with detailed information of what properties that criteria will hold. This includes, but is not limited to, the data type, allowable values, and what ordering those values should have. As will be appreciated by those skilled in the art, such ordering may differ from user to user and is referred to as "subjective ordering" herein.

FIG. 8a is a screen shot 90 of a web page that is used to illustrate how a user can adjust weights and how this can affect the ranking of the results. In FIG. 8a, a weight adjustment interface 92 lists a number of properties including a space property 94, a performance property 96, a safety property 98, a gas mileage property 100, a maintenance cost property 102, a comfort property 104, and a price property 106. Associated with each of these properties is a "slider bar" 112 including a diamond shaped indicator 110 (in this example) which can be adjusted in position along the length of the slider bar, as will be appreciated by those skilled in the art. In a typical interface, a pointer 108 controlled, for example, by a pointing device 18 of computer system 10 of FIG. 1, is used to engage an indicator 110 and to drag to a desired position between the "not important" and the "very important" ends of the slider bar 112. The making and use of slider bars is well known to those skilled in the art. The position of the indicator 110 along the slider bar 112 is translated into a numeric output, typically a normalized value between zero and one, which is the weight for the criterion.

As will be discussed in greater detail subsequently, the user input is analyzed as indicated by the arrow 114 to provide an ordered or ranked list 116 which reflects the preferences of the user. As can be seen in the illustration of FIG. 8a, the Ford Focus ZX3 coupe had the best overall score and was ranked #1 based upon the weighted preferences that were input in the weight adjustment section of screen shot 90. This was followed by the Ford Escape TWD Sport Utility 4D, which was ranked #2, the Ford Taurus SE V6 Wagon 4D, ranked at #3, etc.

Figure 8B:
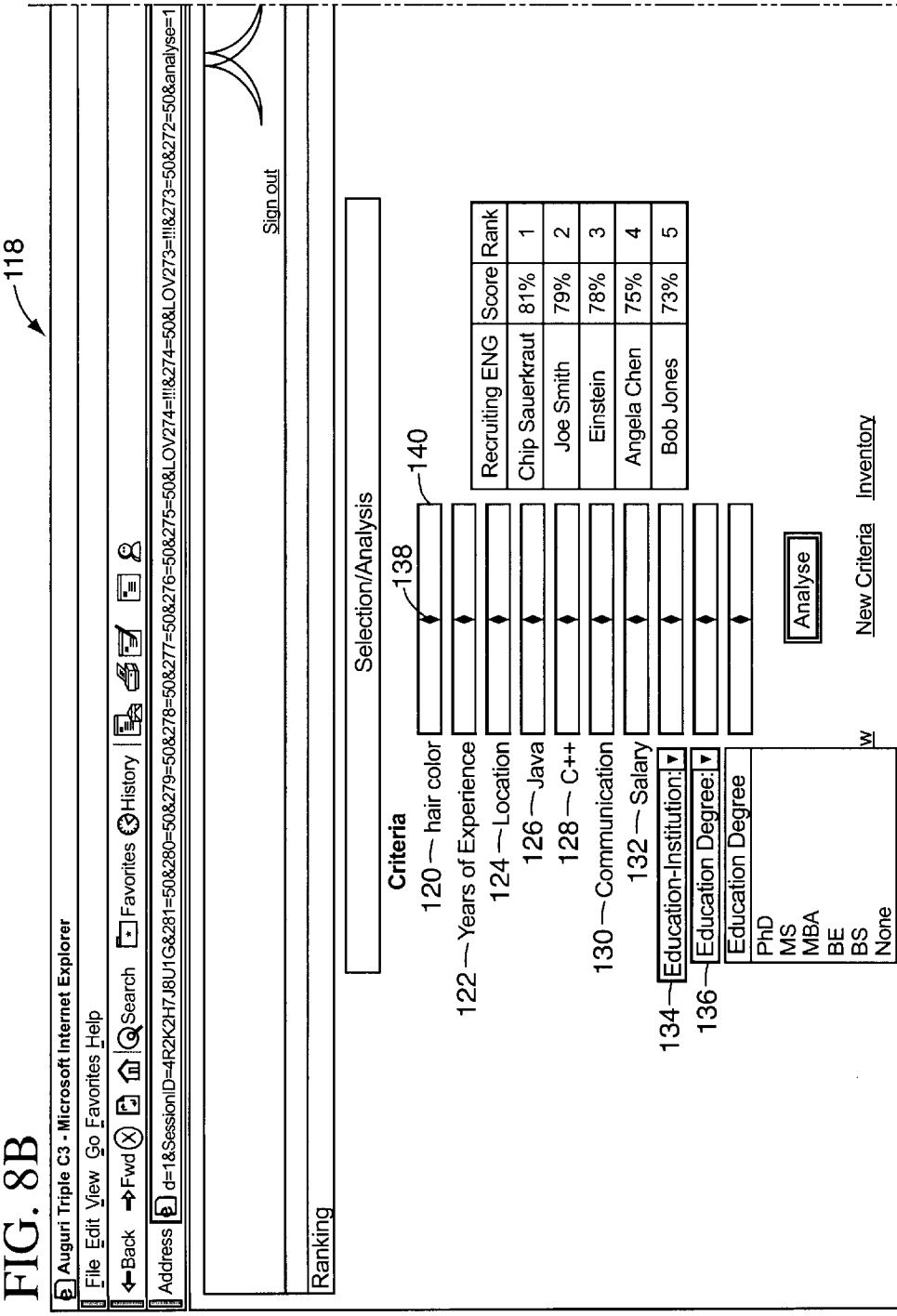
FIG. 8B is another screen shot of a web page illustrating the adjustment of weights.

In FIG. 8b a screen shot 118 provides another example of adjusting weights. In this instance, the different criteria include a hair color property 120, a years of experience property 122, a location property 124, an experience with the Java® computer language property 126, an experience with C++ computer language property 128, a communication skills property 130, a salary requirement property 132, an educational institution property 134, and an educational degree property 136. This weight selection example includes pull-down menus for the educational institution and educational degree properties. As can be seen, the indicators 138 of the various slider bars 140 are defaulted to a central or "neutral" position subject to the relative weighting of the different properties by the user. Based on these neutral ratings, it can be seen that Chip Sauerkraut ranks #1, Joe Smith ranks #2, Einstein ranks as #3, etc. However, as the various properties are weighted by the user, this ordering will change. For example, if the employer is looking for a programmer who is an expert in object oriented programming, the hair color property would be at zero while the years of experience, Java programming, and C++ properties would be relatively high. Since programmers typically do not rely upon communication skills, this can be set fairly low, and the other properties can be set as appropriate. If, on the other hand, an employer is looking to hire a marketing person with good school contacts, the communication property and educational institutions might be adjusted as appropriate, while the ability to program in Java or C++ would likely be given little or no significance. This, again, will reorder the ranking of the potential recruits.

Figure 9:
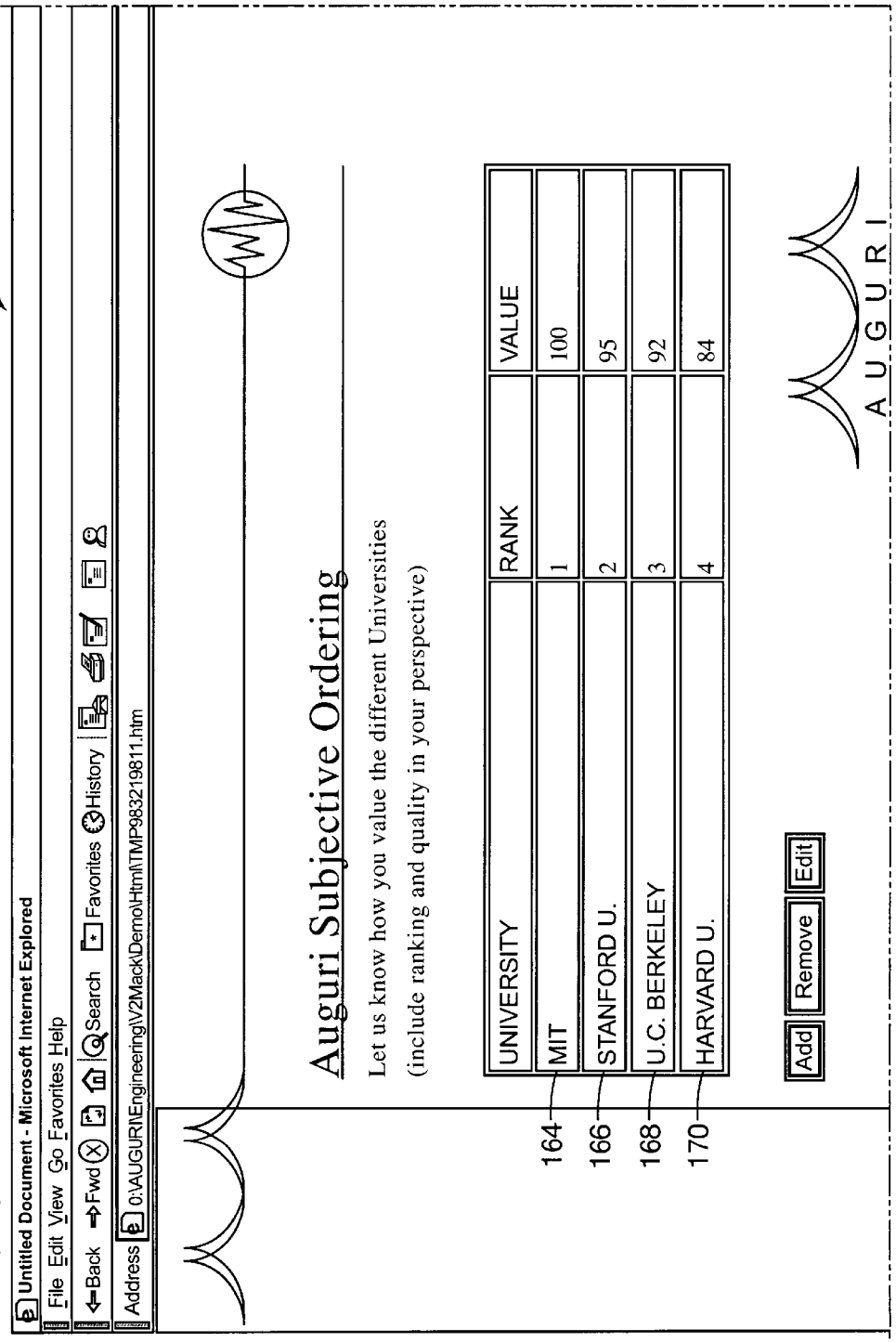
FIG. 9 is another screen shot of a web page illustrating subjective ordering.

In FIG. 9, a screen shot 162 illustrates another example of a user interface which provides a way for a user to input subjective ordering into the system. In this example, a user is allowed to rank under the property "university" various universities including MIT, Stanford University, UC Berkeley, and Harvard University. As noted, this user has rated the MIT, item 164 number 1 and has assigned a value 100 to this item. The Stanford University item 166 was ranked number 2 with a value of 95, the UC Berkeley item 168 was ranked number 3 with a value of 92, and the Harvard University item 170 was ranked number 4 with a value of 84. In this way, if the university of a job applicant is of importance to the recruiter then the subjective ordering of the various universities from the subjective point of view of the recruiter can be reflected in the ultimate ranking of the various potential recruits.

Figure 10:
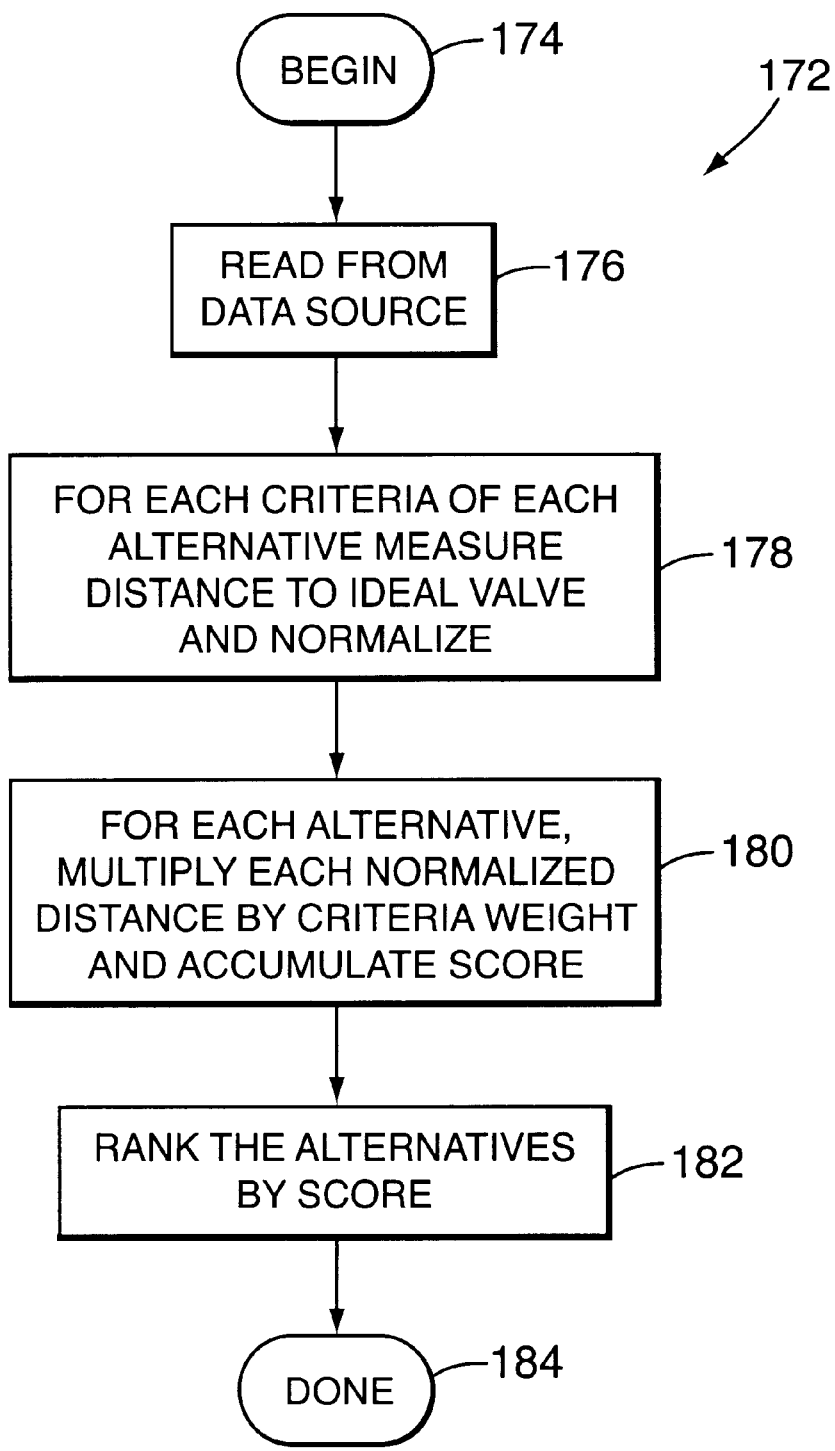
FIG. 10 is a flow diagram illustrating algorithmic operations that can be performed by the algorithm engine of FIG. 2.

FIG. 10 illustrates one preferred implementation for an algorithm of the algorithm processor 42 of FIG. 2. The algorithm, method, or process 172 of FIG. 10 begins at 174 and, in an operation 176, data is read from the data source. Then, in an operation 178, for each criteria of each alternative the "distance" is measured to an ideal value, and the resultant is normalized. Next, in an operation 180, for each alternative the normalized distance is multiplied by the criteria weight and is accumulated. In other words, operation 180 accumulates the product of each normalized distance by its criteria weight. Finally, in an operation 182, the alternatives are ranked by score.

Figure 11:
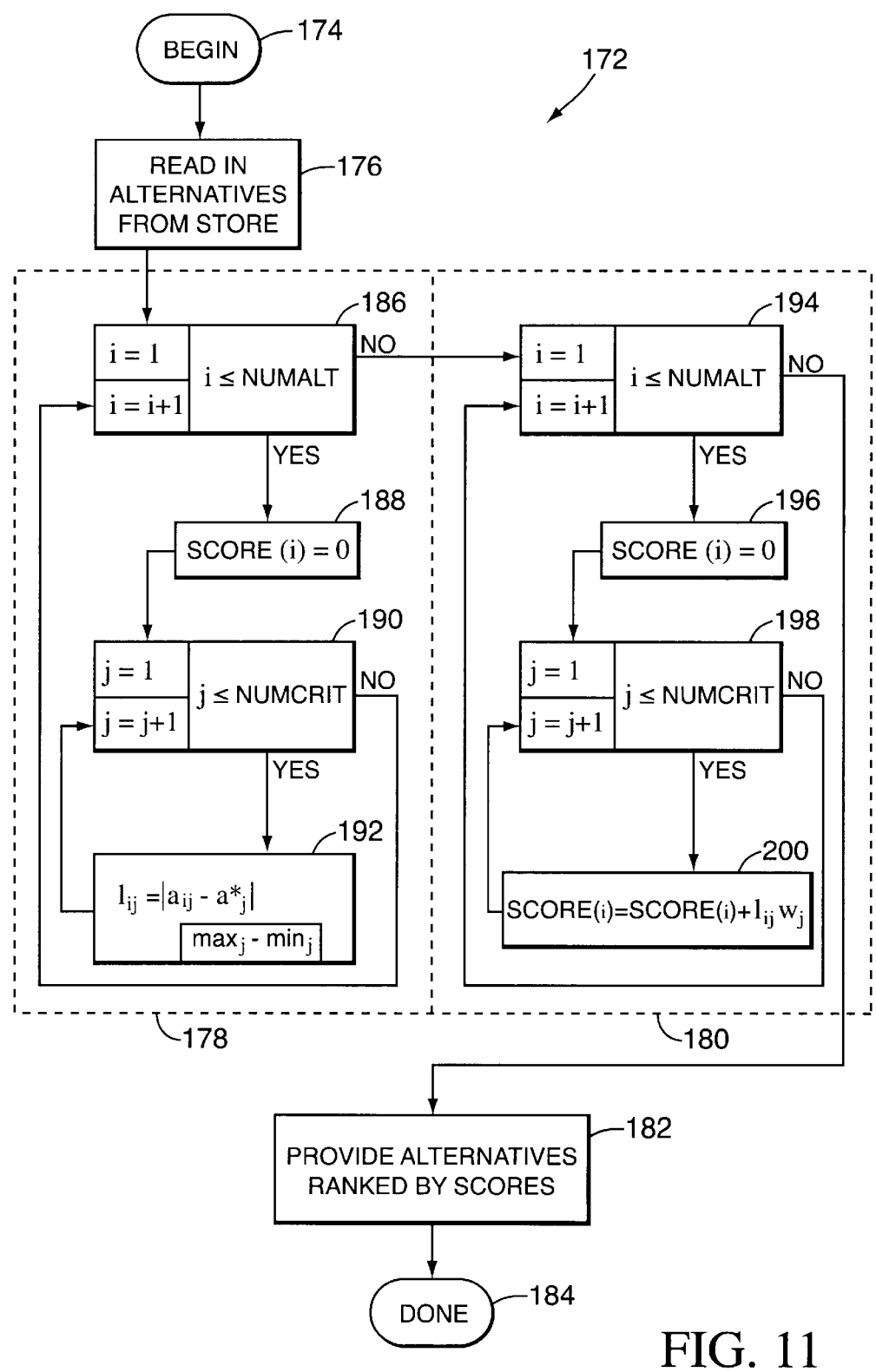
FIG. 11 illustrates in greater detail the algorithm engine method of FIG. 10.

FIG. 11 illustrates the process 172 of FIG. 10 in somewhat greater detail. Again, the process begins at 174 and, in an operation 176 the alternatives are read from the store or other data source. Then, an iterative loop 186 is commenced with a counter beginning at 1, incrementing by 1, and looping until it is less than the number of alternatives NUMALT. Next, in an operation 188, an array element SCORE(i) is initialized at zero and then inner iterative loop 190 is commenced. This inner loop 190 uses a counter j which begins at 1, iterates by 1, and loops until it equals the number of criteria NUMCRIT. Within this inner loop 190 a two dimensional array of distances $1_{ij}$ is created. Each $1_{ij}$ is assigned a value in accordance with Equation One:

$$1_{ij}=|a_{ij}-a^*_j|/|\max_j-\min_j| \qquad \text{Equation One}$$

where $a_{ij}$ is the value of the $j^{th}$ criterion for the $i^{th}$ alternative, $a^*_j$ is the ideal value for the $j^{th}$ criterion, $\max_j$ and $\min_j$ are, respectively, the largest and smallest value that the $j^{th}$ criterion can assume. This will result in a normalized distance $1_{ij}$ for each of the alternatives and criteria such that they all have a value assigned between zero and one. This stored output of the operation 178 is input into the operation 180 which begins with an iterative loop 194 having a counter i beginning at 1, incrementing by 1, and looping until it reaches the number of alternatives NUMALT. The one dimensional array element SCORE(i) is then initialized such that it equals zero in an operation 196 and an inner iterative loop 198 is commenced. This inner iterative loop 198 has a counter j which begins at 1, increments by 1, and which loops until it reaches the number of criteria NUMCRIT. Within this inner loop 198 the value of SCORE(i) is accumulated according to Equation Two:

$$SCORE(i)=SCORE(i)+1_{ij} w_j \qquad \text{Equation Two}$$

where $w_j$ is the weight for the $j^{th}$ criterion. The output of operation 180 is, therefore, the array SCORE, which is then numerically ordered in an operation 182 (e.g. by a simple numeric sorting routine, of which there are many well known to those skilled in the art) to complete the process 172 at 184.

Figure 12:
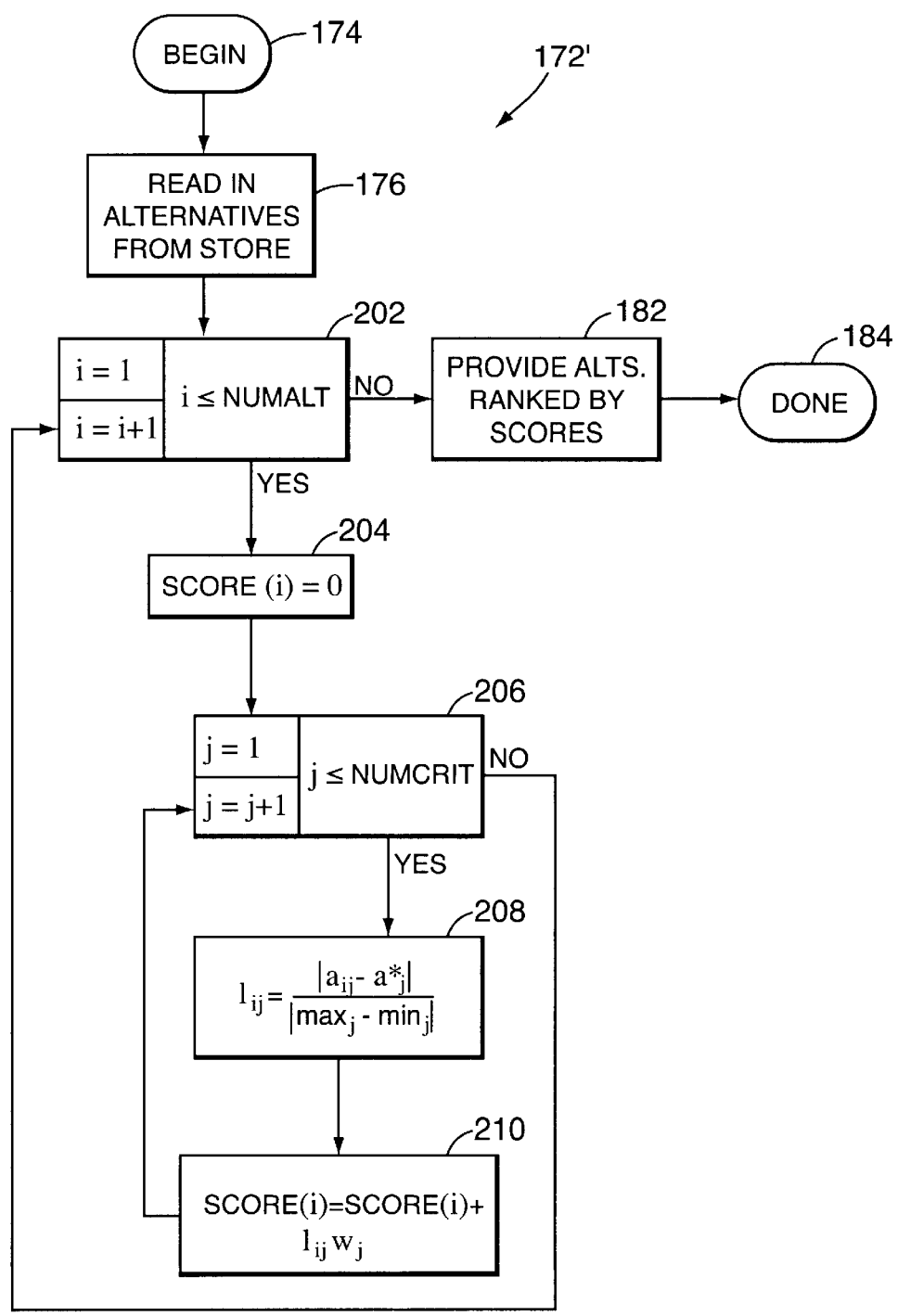
FIG. 12 illustrates an alternative algorithm implemented by the algorithm engine of FIG. 3.

FIG. 12 illustrates an alternative process 172' which produces the same results as the processes 172 as previously explained with reference to FIGS. 10 and 11. In this process 172', the operations 178 and 180, are, essentially, combined for greater computational efficiency. The process 172' begins at 174 and, in the operation 176, the alternatives are read from the data store or other data source. An iterative loop 202 uses the counter i which begins at 1, iterates by 1, and continues until it is equal to the number of alternatives NUMALT. In an operation 204, the array SCORE(i) is initialized to zero and then an inner iterative loop 206 is begun. This inner loop 206 uses a counter j which begins at 1, increments by 1, and continues to loop until j is equal to the number of criteria NUMCRIT. An operation 208 then calculates lij in accordance with Equation One, above. Next, the SCORE (i) is accumulated in accordance with Equation Two, above. The output of the iterative loop 202 is the array SCORE(i) where the parameter i ranges from one to the number of alternatives. The array SCORE(i) is then ranked in operation 182 to complete this process 172' at 184.

Figure 13:
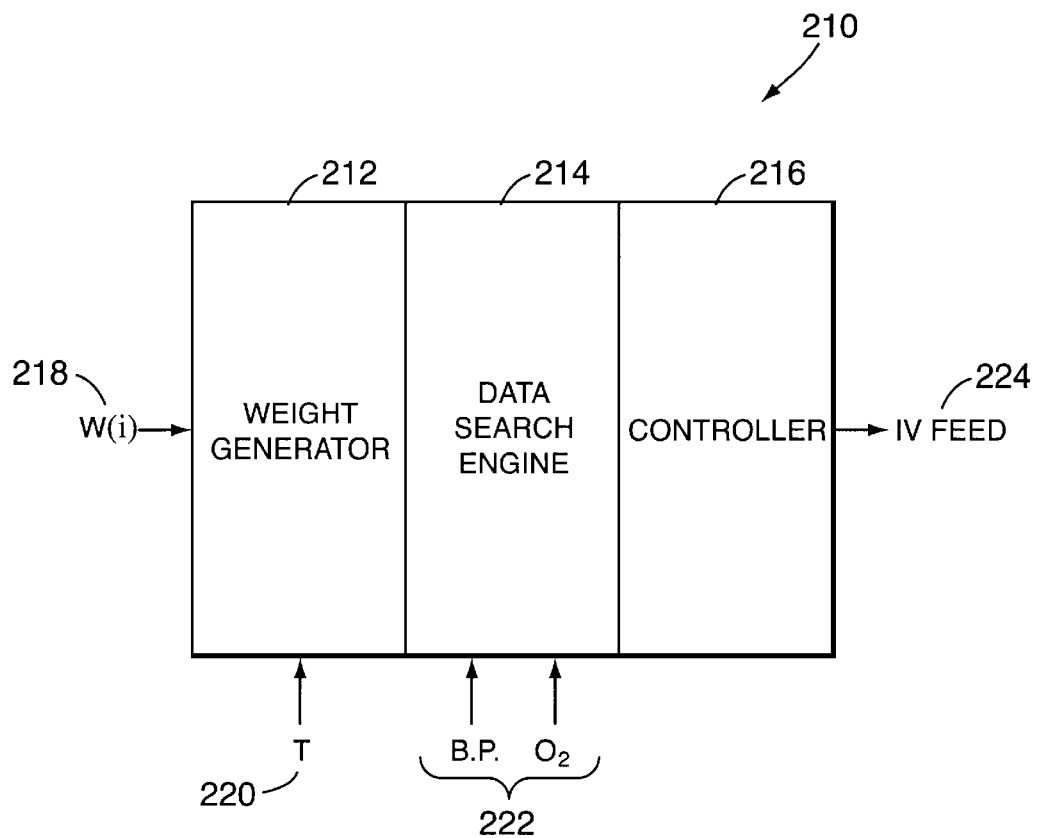
FIG. 13 illustrates an alternative platform implementing the method and system of the present invention.

In FIG. 13, a control system 210 includes a weighted preference generator 212, a weighted preference data search engine 214, and a controller 216. The weighted preference generator 212, a weighted preference data search engine 214, and a controller 216 can form at least a part of one or more integrated circuits, or can be provided separately as part of data processing systems as described previously. Preferably, the weighted preference generator 212, a weighted preference data search engine 214, and a controller 216 are integrated as a single integrated circuit, typically with additional related functionality.

The weight generator develops a set of weights for various criteria. Weights can be input by a client or user as a plurality of weights W(i) as seen at 218. Additionally, sensor or other input, such as temperature T input 220, can be provided to the weight generator 212. When using this sensor or other data, the weight for a criterion can be a function of the sensor or other data input. For example, the weight of criterion "i" can be a function of temperature, i.e. W(i)=f(T).

The data search engine 214 is coupled to the weight generator and to data 222. It receives a set of weights from the weight generator which are used to search the data 222. In this example, data 222 are indicated to be sensor data, namely blood pressure sensor data B.P. and oxygen saturation sensor data $O_2$. Data 222 may also include other sensor data (such as temperature T), and other data inputs, such as data being received via a data feed or from computer readable memory. The weighted preference data search engine develops at least one output responsive to the relative importance of a plurality of criterion derive from the data as indicated by the set of weights provided by said weighted preference generator.

The controller 216 is coupled to the weighted preference data search engine and is operative to provide a control signal, such as control signal 222, based upon the output of the weighted preference data search engine. In this instance, the control signal 222 controls an intravenous (I.V.) drip feed. The output of the weighted preference data search engine 214, in this instance, is the top ranked choice for I.V. drip feed based upon the weighted selection of possible drip feeds.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A computer-implemented method for weighted preference data searching comprising:
   determining weighted preference information including a plurality of search criteria and a corresponding plurality of weights signifying the relative importance of said search criteria and allowing tradeoffs expressed as a plurality of normalized fixed sum weights wherein determining weighted preference information includes:
   a) determining whether there should be user input;
   b) providing at least one of default and automatic heuristically determined weighted preference information if there is not to be user input;
   c) determining whether the user should be able to select criteria;
   d) providing at least one of default and automatic heuristically determined criteria selections if the user is not able to select criteria;
   e) inputting user selection of criteria if the user is allowed to select criteria;
   f) determining whether the user should be able to adjust weights;
   g) providing at least one of default and automatic heuristically determined weights if the user is not able to adjust weights;
   h) inputting user selected weights if the user is allowed to adjust weights;
   i) determining whether the user should be able to input subjective ordering;
   j) providing at least one of default and automatic heuristically determined subjective ordering if the user is not able to subjectively order;
   k) inputting user subjective ordering if the user is allowed to subjectively order; and
   querying a data source and ranking the results based upon said weighted preference information.

2. A computer-implemented method for weighted preference data searching comprising:
   determining weighted preference information including a plurality of search criteria and a corresponding plurality of weights signifying the relative importance of said search criteria wherein determining weighted preference information includes:
   a) determining whether there should be user input;
   b) providing at least one of default and automatic heuristically determined weighted preference information if there is not to be user input;
   c) determining whether the user should be able to select criteria;
   d) providing at least one of default and automatic heuristically determined criteria selections if the user is not able to select criteria;
   e) inputting user selection of criteria if the user is allowed to select criteria;
   f) determining whether the user should be able to adjust weights;
   g) providing at least one of default and automatic heuristically determined weights if the user is not able to adjust weights;
   h) inputting user selected weights if the user is allowed to adjust weights;
   i) determining whether the user should be able to input subjective ordering;
   j) providing at least one of default and automatic heuristically determined subjective ordering if the user is not able to subjectively order; and
   k) inputting user subjective ordering if the user is allowed to subjectively order; and
   querying a data source and ranking the results based upon said weighted preference information.

3. A computer-implemented method for weighted preference data searching as recited in claim 2 wherein said data source is a database.

4. A computer-implemented method for weighted preference data searching as recited in claim 3 wherein said database is a relational database.

5. A computer-implemented method for weighted preference data searching as recited in claim 2 wherein said data source is a data stream.

6. A computer-implemented method for weighted preference data searching as recited in claim 5 wherein said data stream is buffered in a computer readable media.

7. A computer-implemented method for weighted preference data searching as recited in claim 2 further comprising determining a subjective ordering for at least one of said search criteria.

* * * * *